3,371,998
PROCESS FOR THE REMOVAL OF BROMINE, AIR AND CO₂ FROM SALINE WATER

William P. Schambra, Midland, Mich., assignor to The Dow Chemical Company, Midland, Mich., a corporation of Delaware
No Drawing. Filed May 6, 1965, Ser. No. 453,828
5 Claims. (Cl. 23—218)

ABSTRACT OF THE DISCLOSURE

This invention relates to a process for the removal of bromine, air and $CO_2$ from seawater which conmprises adjusting the pH of such water with an acid to a value of 3.0–4.0, admixing chlorine with the acidified water to achieve an oxidation potential of about 0.9–1.00 volt and applying sufficient vacuum to said treated water to remove $CO_2$, air and bromine therefrom.

---

This invention relates to a process for the effective debromination of saline water, and more particularly relates to an improved process whereby bromine values are removed from saline water while simultaneous decarbonating and deaerating such saline water.

In recent years many processes have been made available for the conversion of saline water to potable water. In a majority of these processes, an essential process step is included whereby the saline water is decarbonated and deaerated prior to the final treatment thereof to remove fresh water. Even though many of these methods have been developed on large scale, the cost of producing water is still relatively high. This is partly due to the fact that economical methods of recovering valuable components of these abundantly available saline waters have not been available.

In addition, the conventional process for the recovery of bromine from sea water involves acidification and chlorination of the sea water, followed by passing large masses of air through the water to blow out the bromine. The dilute gaseous mixture of bromine and air is then generally recovered by admixing with $SO_2$ and water to form a water solution of $H_2SO_4$, HBr and HCl. Bromine is liberated from this solution by mixing therewith a stoichiometric quantity of chlorine to release the bromine which is distilled out by steam distillation and condensed to liquid bromine. The sea water residue from this process is presently discarded. Such treatment effectively removes the $CO_2$ from the brine together with the bromine but causes an increase in the dissolved air in such brine and makes it unsuitable for desalinization without further treatment. Air contained in the brine provides oxygen and causes serious corrosion problems, particularly where the brine has been acidified. Likewise, the presence of air provides non-condensables which are undesirable for any multiple effect evaporation or aspiration system.

It is therefore an object of the present invention to provide a process whereby a decarbonization-deaeration step may be combined with a debromination step to thereby recover, in an economical fashion, a valuable component of the brine while simultaneously preparing it for desalinization. It is a further object of the invention to provide an improved process for recovering such bromine. Further objects and advantages of the process will become apparent from reading the following detailed description of the invention.

It has now been discovered that bromine may be removed from saline water more or less simultaneously with the removal of air and $CO_2$ therefrom by employing the following steps: First, the pH of the saline water is adjusted to a value of from 3.0 to 4.0 with an acid; second, sufficient chlorine is added thereto to provide an oxidation potential of 0.9 to 1.0 volt; and third, vacuum is applied to the brine thus treated which causes the air, $CO_2$ and bromine to be removed therefrom into the vapor phase, together with small quantities of water vapor. The vapors thus obtained may then be treated to recover one or more of the components therefrom.

The term "saline water," as used herein, refers to naturally occurring sodium chloride brines such as sea water, brackish water resulting from sea water intrusion into fresh water, esturial water where fresh and sea water are mixed, inland brackish surface or well waters, dilute sub-surface brines such as those produced from oil wells, etc.

The first step of this proces involves acidulating the brine to produce a pH of 3.0 to 4.0. This is generally achieved by adding an acid such as HCl or $H_2SO_4$ to the brine, with mixing, in a sufficient quantity to produce the desired pH. Acidulation in this process is necessary in order to decompose carbonates contained within the brine and to release the $CO_2$ therefrom. A pH of greater than 4 is generally not effective to release the potential $CO_2$ contained within the brine and a pH of less than 3 requires the consumption of acid unnecessarily as no improved result occurs at lower pH.

The second step involves addition of elemental chlorine to brine and is generally accomplished by the addition of chlorine in gaseous form with sufficient stirring or agitation to assure its distribution throughout the brine. This addition is continued until an oxidation potental of 0.9 to 1.0 volt is achieved. Such chlorine addition releases any combined bromine contained within the saline water as elemental bromine. If the oxidation potential of the saline water is less than 0.9 volt the release of bromine in the elemental form is generally not complete. An oxidation potential of greater than 1.0 volt is unnecessary to the successful operation of this process. It is therefore unnecessary to add sufficient chlorine to produce higher oxidation potentials.

Vacuum (reduced pressure) is applied to the treated saline water solution generally in the range of from 35 to 700 mm. of Hg absolute. Such reduced pressure is achieved by using water aspiration, vacuum pumps, or any of the other known methods for reducing the pressure of a solution to below atmospheric.

In general, it is advantageous to expose a relatively large surface of the saline water to the reduced pressure. This may be achieved by passing the saline water through a vacuum chamber in the form of a falling film, by agitation of the liquid, by passing small amounts of air or other inert gas therethrough, or by any other suitable means. The application of reduced pressure to the treated brine causes volatilization of any air contained within the saline water and of the $CO_2$ and $Br_2$ released by previous treatment. These materials, together with small quantities of water vapor, pass into the vapor phase and may then be separated and recovered.

The bromine contained in the vapor phase, together with the water vapor, may be condensed by contact with a cold surface such as would be encountered in a condenser. The liquefied bromine and water form two layers and may be easily separated by simple known means such as decantation. Alternatively, the bromine contained in the vapor phase may be reacted with a material such as ethylene to form ethylene dibromide, or may be passed into a liquid reactant such as aniline to produce tribromaniline. The $CO_2$ and air mixture may then be treated for recovery of the $CO_2$ or both may be vented.

As an alternative procedure, vacuum may be applied to the saline water after the acidification and prior to chlorination. Any released $CO_2$ and any dissolved air is thereby removed. The remaining saline water may then be chlorinated to an oxidation potential of 0.9 to 1.0 volt and vacuum again applied. Bromine and water vapor are then removed without contamination by air or $CO_2$. The bromine may then be condensed and recovered from the water as elemental bromine or it may be reacted with some material such as ethylene or aniline and recovered as a bromine derivative.

The following detailed description of the invention is for the purpose of illustrating a preferred mode of operation but is not to be construed as limiting.

*Example I*

To one million pounds of sea water from the Gulf of Mexico containing 95 p.p.m. bromine as bromide salts was added at 25° C. 120 pounds of $H_2SO_4$ to a sea water pH of 3.5 and 38 pounds of chlorine to an oxidation potential of 0.98 volt. This mixture was thoroughly agitated. Bromine was released from the bromide salts in the sea water and remained dissolved in the sea water at atmospheric pressure. This mixture was then subjected to reduce pressure of 200 mm. of Hg absolute in a vacuum chamber, where 60 lbs. of bromine and the dissolved $CO_2$ and air flashed out of solution. Into the gaseous mixture of $Br_2$, $CO_2$, air and $H_2O$ vapor was injected 11 lbs. of ethylene gas which reacted with the $Br_2$ to form 71 pounds of ethylene dibromide ($C_2H_4Br_2$). The gaseous mixture of $C_2H_4Br_2$, $CO_2$, air and $H_2O$ vapor was then passed over a heat exchanger cooled with chilled water, where ethylene dibromide and water condensed on the cold tube surfaces and were drained off as a two-fluid mixture of liquid ethylene dibromide and water. Ethylene dibromide was then recovered from the water mixture by steam distillation.

Alternatively, the gaseous mixture of $C_2H_4Br_2$, $CO_2$, air and $H_2O$ vapor from the flash vacuum chamber can be contacted with an extended liquid surface of a liquid mixture of $C_2H_4Br_2$ and water, or either of these two components alone, the liquid condensing agent having been previously cooled by other means such as conventional heat exchangers, evaporative cooling technique, or refrigeration. The $C_2H_4Br_2$ is then recovered from the condensing agent by steam distillation as described above. The net overall result is the recovery of approximately 70 lbs. of $C_2H_4Br_2$ from the original one million pounds of sea water.

I claim:
1. An improved process for the removal of bromine, air and $CO_2$ from saline water which comprises:
   (1) adjusting the pH of said saline water to a value of from 3.0 to 4.0 with an acid,
   (2) admixing chlorine with said acidified brine to produce an oxidation potential of from 0.9 to 1.0 volt, and
   (3) applying sufficient vacuum to said treated saline water to remove $CO_2$, air and bromine therefrom.

2. An improved process for the removal of bromine, air and $CO_2$ from saline water which comprises:
   (1) adjusting the pH of said saline water to from 3.0 to 4.0 with an acid,
   (2) admixing chlorine with said brine to produce an oxidation potential of from 0.9 to 1.0 volt,
   (3) applying sufficient vacuum to said treated brine to cause volatilization of the $CO_2$, air and $Br_2$ therefrom, and
   (4) recovering the bromine thus volatilized.

3. An improved process for the removal of bromine, air and $CO_2$ from saline water which comprises:
   (1) adjusting the pH of said saline water to from 3.0 to 4.0 with an acid,
   (2) applying sufficient vacuum to said acidified saline water to remove the $CO_2$ and air therefrom,
   (3) admixing chlorine with said brine to produce an oxidation potential of from 0.9 to 1.0 volt,
   (4) applying sufficient vacuum to said treated brine to cause volatilization of the bromine therefrom, and
   (5) recovering the bromine thus volatilized.

4. An improved process for the removal of bromine, air and $CO_2$ from saline water which comprises:
   (1) adjusting the pH of said saline water to from 3.0 to 4.0 with an acid,
   (2) applying sufficient vacuum to said acidified saline water to remove $CO_2$ and air therefrom,
   (3) admixing chlorine with said brine to produce an oxidation potential of from 0.9 to 1.0 volt,
   (4) reducing the pressure on said treated brine sufficiently to volatilize sufficient water to sweep the bromine therefrom, and
   (5) separating the bromine and water thus produced.

5. An improved process for the removal of bromine, air and $CO_2$ from saline water which comprises:
   (1) adjusting the pH of said saline water to from 3.0 to 4.0 with an acid,
   (2) admixing chlorine with said brine to produce an oxidation potential of from 0.9 to 1.0 volt,
   (3) applying sufficient vacuum to said treated brine to cause volatilization of the $CO_2$, air and $Br_2$ therefrom,
   (4) reacting said bromine with ethylene in the vapor phase to produce ethylene dibromide, and
   (5) recovering the ethylene dibromide therefrom.

References Cited

UNITED STATES PATENTS

| | | | |
|---|---|---|---|
| 2,088,159 | 7/1937 | Boundy et al. | 260—662 |
| 2,133,616 | 10/1938 | Grebe et al. | 23—216 |
| 2,388,586 | 11/1945 | Williamson et al. | 23—216 X |
| 3,181,934 | 5/1965 | Davis | 23—218 |

FOREIGN PATENTS

| | | |
|---|---|---|
| 382,512 | 10/1932 | Great Britain. |

OTHER REFERENCES

Degering Book, "Organic Chemistry," College Outline Series, 6th edition (1959), pp. 39–41, Barnes and Noble, Inc., New York.

MILTON WEISSMAN, *Primary Examiner.*

EDWARD STERN, *Examiner.*